United States Patent [19]

Benier

[11] 4,124,305
[45] Nov. 7, 1978

[54] METHOD AND APPARATUS FOR ROUNDING LUMPS OF DOUGH

[75] Inventor: Johan Benier, Vught, Netherlands

[73] Assignee: Benier B.V., 's-Hertogenbosch, Netherlands

[21] Appl. No.: 747,326

[22] Filed: Dec. 3, 1976

[30] Foreign Application Priority Data

Dec. 8, 1975 [NL] Netherlands .................. 7514266

[51] Int. Cl.² ................... B28C 1/16; A21C 3/02
[52] U.S. Cl. ................................. 366/69; 425/332
[58] Field of Search ............. 259/185, 2; 425/332; 426/496; 198/750, 636, 637

[56] References Cited

U.S. PATENT DOCUMENTS

| 936,660 | 10/1909 | Petri | 425/332 |
| 936,661 | 10/1909 | Petri | 425/332 |
| 3,004,501 | 10/1961 | Wadley | 425/332 |
| 3,311,068 | 3/1967 | Atwood | 425/332 |

FOREIGN PATENT DOCUMENTS 1,210,318 10/1970 United Kingdom.

Primary Examiner—Robert W. Jenkins
Attorney, Agent, or Firm—Morgan, Finnegan, Pine, Foley & Lee

[57] ABSTRACT

A method of rounding lumps of dough, in which one lump of dough is contacted with two faces including an angle and in which the lump of dough is subjected to a frictional kneading effect by moving the two faces relative to one another, wherein the lump of dough is placed on a reciprocable surface and is alternately contacted with two surfaces disposed above said surface and including a rounding path.

8 Claims, 4 Drawing Figures

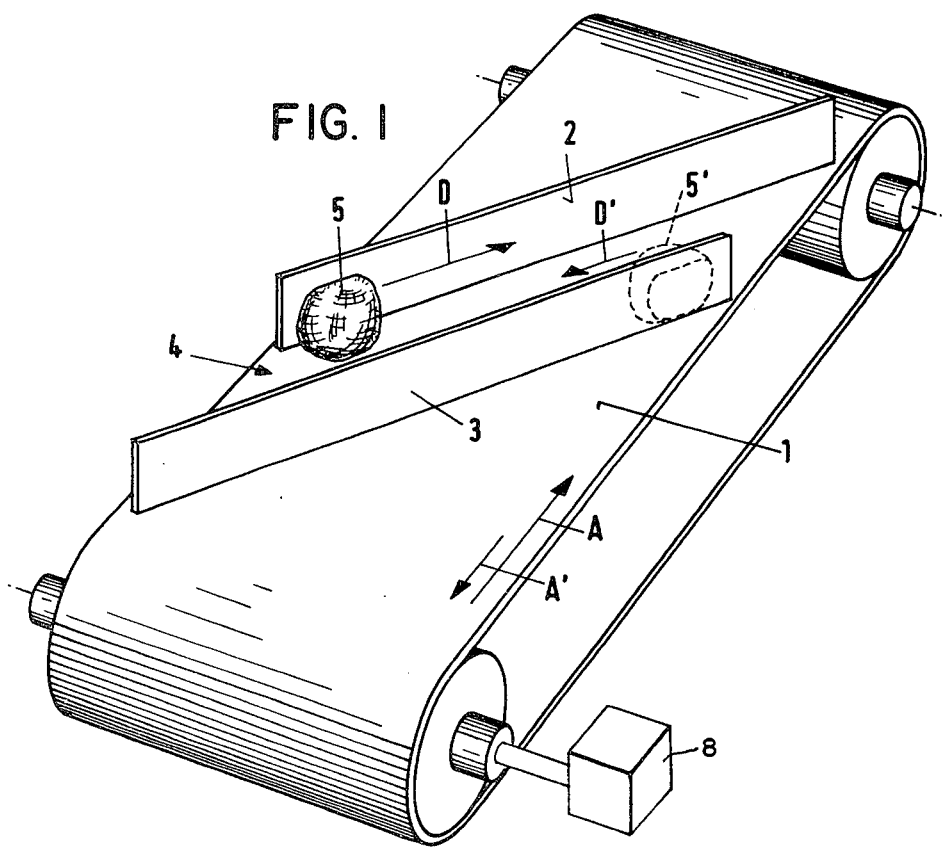
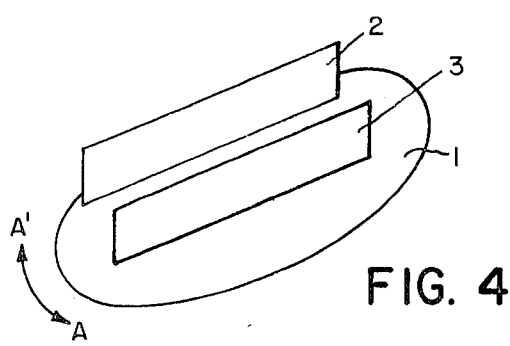

METHOD AND APPARATUS FOR ROUNDING LUMPS OF DOUGH

This invention relates to a method of rounding lumps of dough, in which one lump of dough is contacted with two faces including an angle and in which the lump of dough is subjected to a frictional kneading effect by moving the two faces relative to one another.

Owing to the frictional kneading effect to which the lump of dough is subjected the latter is rounded, that is, deformed to a manipulatable spherical shape having a smooth, tensioned skin. The rounding effect is more intensive according as the frictional kneading effect extends over a longer path in other words, dough displacements at the spherical surface cover the largest possible part of this surface.

A known type of rounding equipment includes a supporting surface and an upright wall portion, the supporting surface extending horizontally, for example being formed by a horizontal conveyor belt, and upright wall portions having the form of cylindrical sleeves. The sleeves are movable relative to one another over the supporting surface along substantially circular paths. The inner wall of the sleeve exercises the above frictional kneading effect on the face of a sphere of dough resting on the supporting surface within a sleeve. The operation of this equipment is in principle discontinuous, for after completion of the rounding treatment the sleeves have to be lifted from the supporting surface to discharge the spheres of dough. Besides the equipment appears to be disadvantageous in actual practice that there is a substantially fixed ratio between the dimensions of the sleeve and the size of the lumps of dough so that each time accurate positioning is necessary to introduce each sphere of dough into a cylindrical sleeve.

In another known rounding apparatus the supporting surface is formed by a substantially vertically arranged cone or cylinder rotary about its axis, while the wall portion is formed by a trough extending helically around it. A sphere of dough placed in the trough is partly supported against the surface of the cone and is subjected to a frictional kneading effect as the sphere moves through the trough as a result of the rotation of the cone. A drawback of this apparatus is that the frictional kneading effect is not optimal, as the sphere of dough moves with respect to both surfaces. An additional drawback is that the residence time of a sphere of dough in the apparatus is determined by the trough length, which is fixed, and the rotary speed of the cone, which cannot be varied without influencing the frictional effect adversely.

A third known rounding apparatus comprises a horizontal conveyor belt forming the supporting surface, above which, at an angle with respect to the direction of movement of the conveyor belt, one upright wall portion is spacially and fixedly arranged. A sphere of dough is placed against the wall and is moved along the wall by the conveyor belt moving continuously in one direction. The rounding effect in this apparatus is exclusively dependent on the linear speed of the belt which, like in the rounding machine having a cone and a helical trough, is disadvantageous in that the residence time cannot be varied without influencing the frictional kneading effect.

The object of the invention is to remove the above drawbacks.

To this end, according to the invention, the lump of dough is placed on a reciprocating surface and is alternately contacted with two surfaces disposed above said surface and including a rounding path. The method according to the invention is advantageous in that the residence time in the rounding path can be determined at will, without varying the relative speed between the surface on which the sphere of dough is supported and the surfaces along which the sphere of dough is moved, so without changing the frictional kneading effect which the surfaces have on the sphere of dough.

For carrying out the method use can be made of a rounding apparatus comprising a supporting surface for one or more lumps of dough and a wall portion extending upwardly from the supporting surface, the supporting surface and the wall portion being movable relative to one another, which apparatus is characterized by two substantially parallel wall portions including a rounding trough, below which wall portions the supporting surface can be reciprocated. In this apparatus the rounding trough included by the wall portions can be at an angle to the direction of movement of the supporting surface. The lump of dough is thereby alternately forcibly contacted with said wall portions, namely each time with the downstream wall, seen in the momentaneous direction of movement of the supporting surface.

In principle the return stroke of the supporting surface can be equal to the forward stroke, so that the sphere of dough each time returns to its starting point. Preferably the return stroke is always kept shorter than the forward stroke, so that the sphere of dough moves incrementally through the trough and successive spheres can be fed to the apparatus. At the discharge end of the trough opposite the feed end spheres of dough which have moved along a rounding path many times longer than the length of the trough leave the rounding apparatus.

In a preferred embodiment of the invention the rounding apparatus is characterized in that the rounding trough included by the wall portions extends substantially in the direction of movement of the supporting surface and the wall portions can be moved separately with a motion component which is at an angle to the direction of movement of the supporting surface. This motion component of the wall portions can be substantially perpendicular to the direction of movement of the supporting surface, according to the invention.

This apparatus can be driven in such a manner that when the supporting surface moves in one direction, during which a sphere of dough moves through the trough formed between the two wall portions, the sphere is contacted with one of the wall portions which during said movement of the supporting surface is moved in the direction of the other wall portion. During the return movement of the supporting surface the former wall portion returns to its starting position and the other wall portion is moved in the direction of the centre of the trough.

The sphere of dough is alternately contacted with the two wall portions, while in principle the sphere of dough does not move over the supporting surface, so that the frictional effect exercised on the sphere of dough by the successive wall portions is optimal: in fact, for the frictional kneading effect the total relative displacement of the sphere of dough relative to each of the wall portions is used. Also in this apparatus the return stroke of the supporting surface can be chosen each time somewhat shorter than the forward stroke, so that more than one sphere of dough can be treated at the same time in the apparatus. Furthermore it is possible to move the two wall portions together in the same direction. The residence time of a sphere of dough can be varied within wide limits to adapt to the nature of the dough, independent of the relative movement and speed of movement of the supporting surface and/or of the wall portions, which speeds are separately adjustable.

To further adapt the frictional kneading effect to sizes of lumps of dough and to the nature of the dough used, the angle included by each of the upright wall portions with the supporting surface can be adjustable, according to the invention.

The supporting surface can be the upper part of a conveyor belt driven in two directions, or the supporting surface can be a curved surface, moving to and fro around the axis of curvature, the supporting surface can also be a flat disc (FIG. 4) rotating to and fro about an axis of rotation.

In all cases a rounding apparatus is obtained which can operate continuously, in which the positioning of the spheres of dough is not critical and in which the frictional kneading effect is optimal in that the difference in movement of supporting surface and upright wall or walls is used optimally.

The invention will now be elucidated in more detail with reference to the drawings showing some embodiments of the rounding apparatus by way of example.

FIG. 1 shows a rounding apparatus in a substantially simplified form in perspective;

FIG. 4 is a schematic diagram of the rounding apparatus with a flat disc supporting surface.

Figure 2:
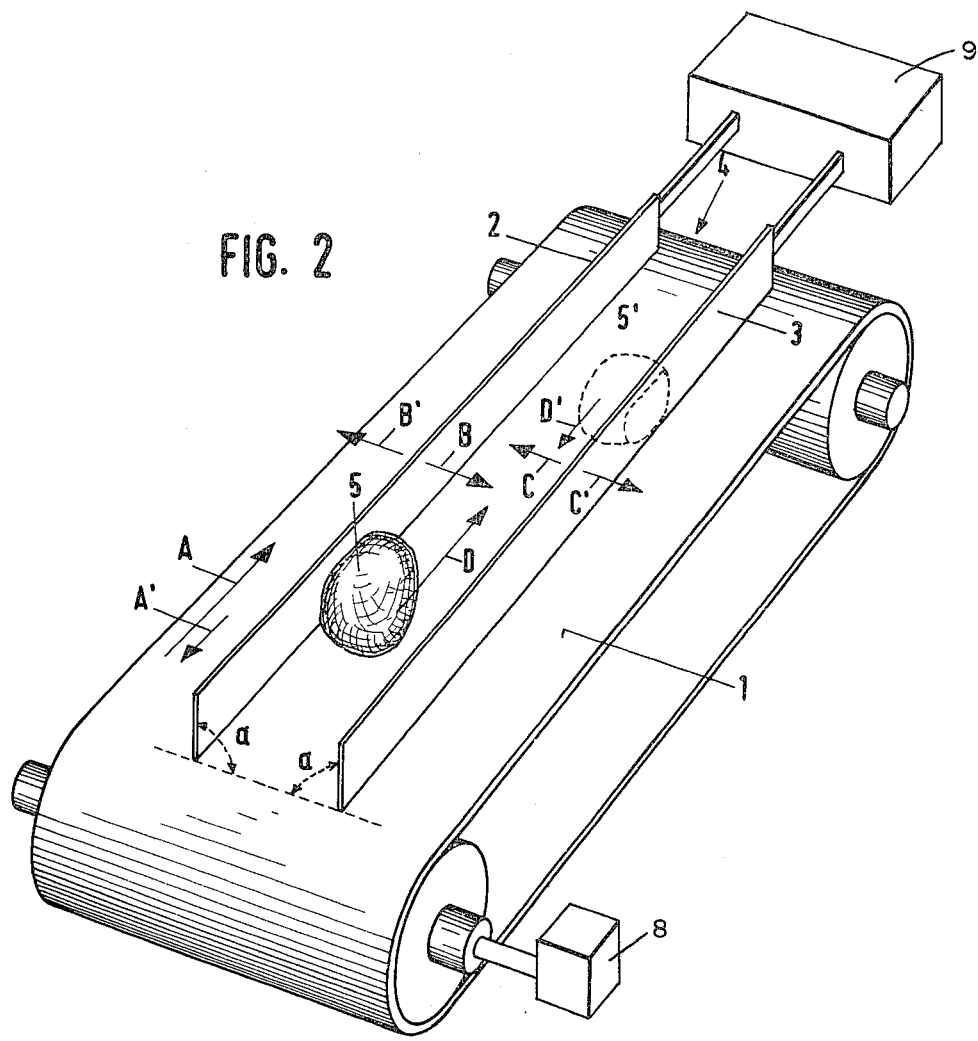
FIG. 2 is a view in accordance with FIG. 1 of the preferred embodiment of the rounding apparatus and FIG. 3 is a schematic diagram of the rounding apparatus with curved supporting surface.

As shown in FIGS. 1 and 2, the rounding apparatus includes a supporting surface 1 in the form of the upper part of an endless conveyor belt. Supporting surface 1 is reciprocable, as illustrated by arrows A and A', in which arrow A represents the forward stroke direction and arrow A' the return stroke direction. By drawing arrow A longer than arrow A' it is expressed that the return stroke can be shorter than the forward stroke. The effect produced by this will be elaborated upon hereinafter.

In the embodiment of FIG. 1 two walls 2 and 3 extend substantially parallel obliquely above the supporting surface 1. The walls include a trough 4, in which the rounding of lumps of dough takes place, one of which is shown in the drawing. This lump of dough 5 is moved during the forward stroke A of supporting surface 1 in the direction of arrow D along the downstream wall 2, seen in the direction of arrow A. During the return stroke of supporting surface 1 in the direction of arrow A' this same lump of dough, now designated by 5', moves in the direction of arrow D' and is in contact with the downstream wall 3, as seen in the direction of movement of supporting surface 1 in the direction of arrow A'. Reciprocating means 8 is adapted to move the supporting surface in the described directions.

In the embodiment of FIG. 2 walls 2 and 3 are arranged substantially in the direction of movement A and A' of supporting surface 1 and walls 2 and 3 are movable over the supporting surface independently of one another, as indicated for wall 2 by arrows B and B' and for wall 3 by arrow C and C'. Any known drive means 9 can be used for moving walls 2 and 3, so that this need not be discussed here.

The movement of supporting surface 1 and that of walls 2 and 3 is preferably in such a manner that during the forward stroke A of supporting surface 1 wall 2 performs stroke B and wall 3 performs stroke C'. When supporting surface 1 performs the return stroke A', wall 2 moves in the direction of arrow B' and wall 3 in the direction of arrow C.

The effect of these movements is that during the forward stroke A of supporting surface 1 a lump of dough 5 resting thereon moves along with supporting surface 1, as indicated by arrow D and as at the same time wall 2 moves in the direction of arrow B, the lump of dough 5 is kept into contact with wall 2 for the entire duration of stroke A in such a manner that wall 2 has a frictional kneading effect on sphere 5. During the return stroke of supporting surface 1 in the direction of arrow A', wall 2 moves in the direction of arrow B' and wall 3 in the direction of arrow C, so that during movement of sphere 5 (herein referred to as 5') in the direction of arrow D', wall 3 has a frictional kneading effect thereon.

The distance covered by walls 2 and 3 is so adapted to the distances which the supporting surface and hence sphere 5 or 5' resting thereon cover during strokes A and A' that walls 2 or 3 are positively laterally urged against sphere 5, 5'. As sphere 5, 5' will tilt a little under the influence of the lateral pressure thereon, the respective walls 2 and 3 will exercise a frictional kneading effect thereon in a substantially continuous helical path, so that the requirement is met that the frictional kneading effect each time covers a very large part of the spherical surface. Moreover, without varying the speed of movement of supporting surface 1, the residence time of a sphere 5 in the rounding apparatus can be adjusted indefinitely. This residence time is in fact only determined by the difference in stroke length A and A'. If stroke length A equals A', sphere 5 always returns to the starting point and rounding can be continued indefinitely. In actual practice, however, stroke length A' will be chosen shorter than stroke length A, so that a sphere 5 has advanced in the trough after each forward and return movement of supporting surface 1 and a subsequent sphere of dough can be fed to the feed end of trough 4.

The rounding apparatus according to the invention operates continuously, therefore. The apparatus is open, so that feeding of successive lumps of dough does not present any problem. The residence time can be adjusted indefinitely, as also the kneading effect, as also the speed of movement of supporting surface 1 and, in the embodiment of FIG. 2, of each of walls 2 and 3 is adjustable.

Preferably walls 2 and 3 are adjustable insofar as their mutual distance and the angle of inclination is concerned, to adapt to the size of the lumps of dough and to the nature of the dough.

Figure 3:
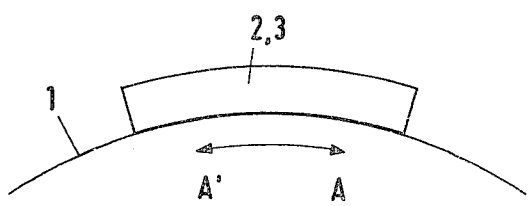

It will be clear that the invention is not limited to the embodiments described above and shown in the drawings but that all kinds of variants are possible without departing from the scope of the present invention. For example, as shown in FIG. 3, the supporting surface 1 can have a curved configuration. The supporting surface can also have the form of a rotary disc.

I claim:
1. An apparatus for rounding lumps of dough comprising:

(a) a supporting surface for supporting one or more lumps of dough;
(b) two substantially parallel wall portions positioned above and extending upwardly over said supporting surface, said supporting surface and said two substantially parallel wall portions defining a rounding trough for rounding said lump of dough, said rounding trough being positioned at an angle to the direction of movement of said supporting surface; and
(c) means for reciprocating and supporting surface for alternately contacting said lump of dough first with one and thereafter with the other of said two substantially parallel wall portions.

2. A rounding apparatus according to claim 1 wherein the angle defined by each of the upright wall portions with the supporting surface is adjustable.

3. A rounding apparatus according to claim 1 wherein the supporting surface is a conveyor belt.

4. A rounding apparatus according to claim 1 wherein the supporting surface is curved.

5. A rounding apparatus according to claim 1 wherein the supporting surface is a flat disc rotatable in two directions.

6. An apparatus for rounding lumps of dough comprising:
(a) a supporting surface for supporting one or more lumps of dough;
(b) two substantially parallel wall portions positioned above and extending upwardly over said supporting surface, said supporting surface and said two substantially parallel wall portions defining a rounding trough for rounding said lump of dough, said rounding trough extending substantially in the direction of movement of said supporting surface and said two substantially parallel wall portions moving separately from the reciprocal movement of said supporting surface with a motion component which is at an angle to the direction of movement of the supporting surface; and
(c) means for reciprocating said supporting surface for alternately contacting said lump of dough first with one and thereafter with the other of said two substantially parallel wall portions.

7. A rounding apparatus according to claim 6 wherein the rounding trough defined by the two substantially parallel wall portions and the supporting surface extends substantially in the direction of movement of the supporting surface and the two substantially parallel wall portions are together movable in the same direction with a motion component which is at an angle to the direction of movement of the supporting surface.

8. A rounding apparatus according to claim 6 wherein the motion component of the two substantially parallel wall portions is substantially perpendicular to the direction of movement of the supporting surface.

* * * * *